United States Patent [19]
Hovey

[11] 3,781,881
[45] Dec. 25, 1973

[54] BEACON TARGET SELECTOR AND EVALUATOR

[75] Inventor: John M. Hovey, Oxon Hill, Md.

[73] Assignee: The United States of America as represented by the Secretary of the Navy, Washington, D.C.

[22] Filed: July 21, 1972

[21] Appl. No.: 273,912

[52] U.S. Cl............................ 343/6.5 R, 343/5 DP
[51] Int. Cl............................................. G01s 9/56
[58] Field of Search..................... 343/5 DP, 6.5 R

[56] References Cited
UNITED STATES PATENTS
3,412,397   11/1968   Evans .............................. 343/5 DP Primary Examiner—T. H. Tubbesing
Attorney—R. S. Sciascia et al.

[57] ABSTRACT

An IFF target evaluator comprising signal-storage means consisting of a plurality of series-connected shift registers each of whose outputs are also connected to a different level of a Pascal-triangle configuration of AND and OR gates used as a decoding means. The outputs of the decoding means show whether a series of consecutive pulse positions contain enough pulses to indicate a target; how many consecutive "ones" have been received from a predetermined number of range sweeps; and how many consecutive "zeros" have been received.

5 Claims, 1 Drawing Figure

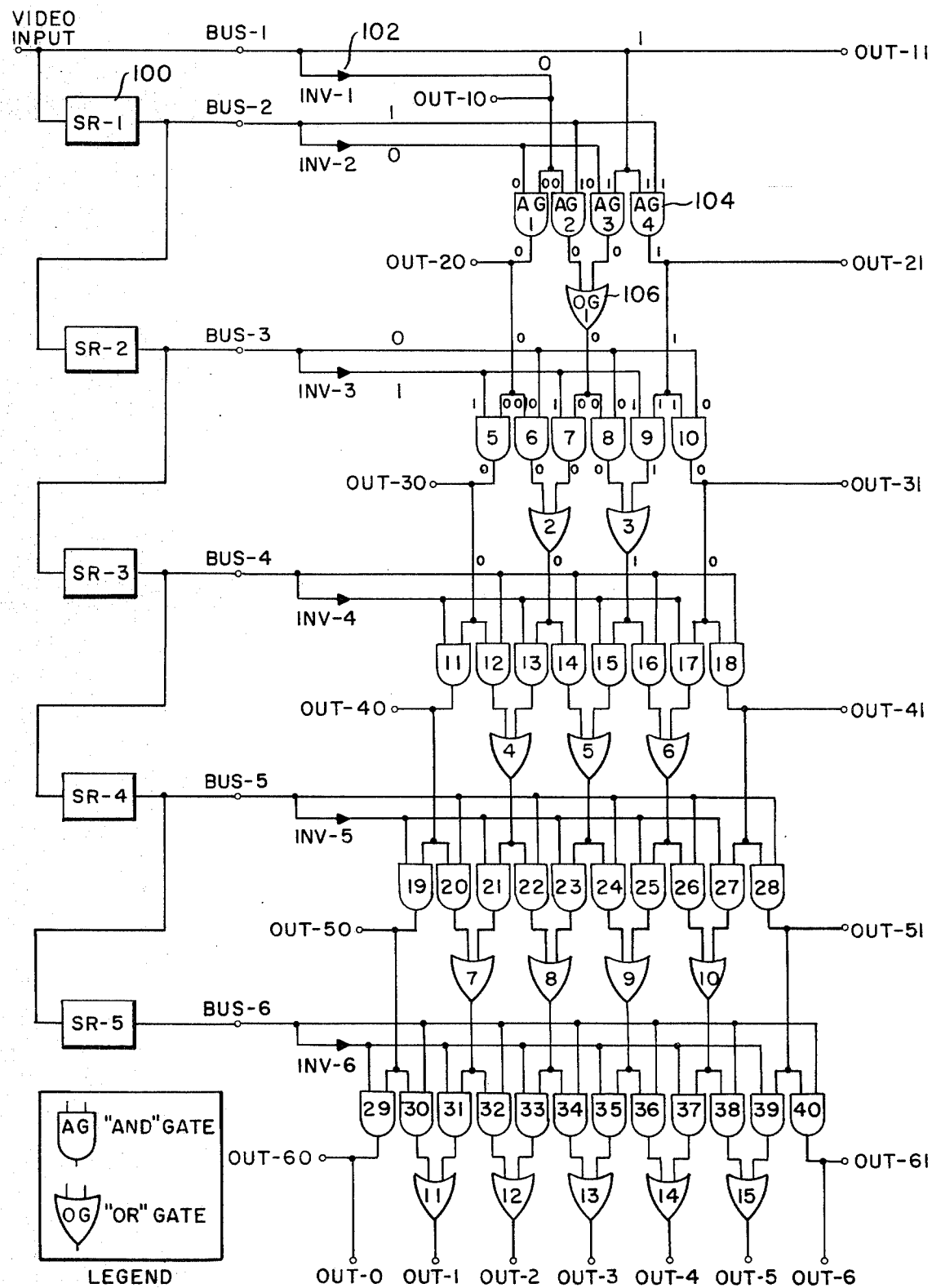

BEACON TARGET SELECTOR AND EVALUATOR

BACKGROUND OF THE INVENTION

This invention relates to beacon systems and especially to an improved circuit for identifying friendly targets in an beacon system.

The solution to the problem of sensing and identifying (classifying) targets in beacon systems in general and particularly in military IFF (Identification — Friend or Foe) systems, such as the Mark XII IFF system, has been pursued for a number of years. Some evaluators have been developed as demonstration devices and a very complex "all target evaluator" was built for use in SAGE (Semi-Automatic Ground Equipment). All units that have been developed thus far have been very complex, bulky and expensive and some have not been based on valid statistical criteria.

SUMMARY OF THE INVENTION

The present invention comprises logic circuitry which forms a storage means and a decoding means. The storage means provides several, e.g., five, outputs comprising the return signals received from five consecutive IFF interrogations at the same relative time in each interrogation period. The decoding means comprises a five-level, triangular configuration of AND or OR-gates gates arranged to provide outputs which indicate for any consecutive six-bit word. The circuitry is expandable or compressible, as desired, to evaluate a word of any size.

OBJECTS

An object of the invention is to sense and evaluate targets for a beacon system.

Another object is to provide an IFF target evaluator which is relatively simple and small in structure and inexpensive.

Other objects, advantages and novel features of the invention will become apparent from the following detailed description of the invention when considered in conjunction with the accompanying drawing wherein:

BRIEF DESCRIPTION OF THE DRAWING

The single FIGURE illustrates an embodiment of the invention.

DETAILED DESCRIPTION OF THE INVENTION

In general, the invention comprises a storage means which receives target signal returns from IFF interrogations and a decoding means for evaluating the return signals. The decoding means receives the outputs of the storage means as part of its input signals. (An interrogation period is considered to be equivalent in time, for example, to the time required for a PPI radial sweep where the PPI indicator is being used in the IFF system to provide a visual display of targets.)

The storage means may comprise a plurality of shift registers 100 (see FIG.) in series with each other. (For the purpose of simplicity of illustration and explanation, only five registers are shown. However, any number can be used.) The shift registers are multi-stages (or bit positions) clocked at a 1 MHz rate. Each register therefore provides 1000 $\mu$sec of storage with a granularity of 1 $\mu$sec. The clock (not shown) which drives the registers is enabled coincident with each interrogation and runs for 1000 counts. The output from the last stage of each register appears on its associated bus; thus, the output of SR-1 appears on Bus-2. (It should be noted that the operation of the storage registers chops the interrogation period into 100 smaller periods of 1 $\mu$sec each. Each smaller period corresponds to a distance (actually a small range of distances) and therefore each shift-register stage or position is sometimes called a range bin.)

The wideo signals derived in the course of each interrogation are entered into SR-1 at "Video Input" and are shifted along to a position in the register (range bin) corresponding to the range of the target, when the register is full (the interrogation is complete). At the start of the next interrogation, the output of the last stage of SR-1, which appears on Bus-2, is shifted into the first stage of SR-2. At the end of the second interrogation, all the information received from the first interrogation is in the register SR-2 and all received from the second interrogation is in SR-1, with corresponding bit positions, or stages, in each register containing information from the same range. This continues until at the end of the fifth interrogation, all the information received from che first interrogation is in SR-5. Note that the time of entry of any bit will determine its final position in the registers. For example, information received during the one-hundredth microsecond following an interrogation will finally appear in the stage which is one hundred stages from the last stage in the shift register.

As reply video from any interrogation arrives at "Video Input," it is loaded into SR-1 and also applied to Bus-1. Video from previous interrogations that was received at the same relative time in each interrogation period appears at Bus-2 through Bus-5 simultaneously. It may be seen that if replies to six consecutive interrogations were received from an aircraft at a range of approximately 8 miles, each register would contain a reply bit in stage 100 and that, as the reply bit to the sixth interrogation is received, corresponding bits from the preceding five interrogations are all available in parallel on the shift-register output busses. At this instant, a parallel logic operation can be performed to determine certain characteristics of the return signals. The results can be read out and display at the appropriate range and azimuth on an associated display means.

The means for evaluating the data in the storage registers is the decoding means which is in essence, and electronic embodiment of Pascal's triangle. (Hereinafter the term "Pascal-triangle decoding means" will be understood to be the decoder circuit which is described below.) The decoder consists of a level of AND and OR-gates, 104 and 106 respectively, for each shift register. Thus, in the present embodiment, there are five shift registers and five levels in the decoder. The first level has four AND gates (AG-1, AG-2, AG-3 and AG-4) and one OR-gate (OG-1). Each level adds two AND-gates and one OR-gate so that level two has six AND-gates and two OR-gates, level three has eight AND-gates and three OR-gates, and so on.

In the triangle, the outputs of the two outer AND-gates (one on each side) is fed directly to the next lower level, whereas the inner AND-gates are formed into pairs, the output of each pair being fed to a different OR-gate before being fed to the next lower level. Thus, the outputs of AG-1 and AG-4 go directly to the second level but the outputs of AG-2 and AG-3 are fed as a pair to OG-1 and its output goes to level two. The number of OR-gates can be found from the formula (OR-gates) = (AND-gates) −2/2

The input to each level of the decoder can be considered to be of two types: first, a stored input from its associated register consisting of the output from the last stage of the register which is on the Bus and, second, the inverted signal from the Bus since each Bus signal is also applied to its associated inverter 102. (Thus, the signal on Bus-4 is applied to the input of INV-4 (inverter-4).

TABLE I

| Level | No. AND Gates | No. OR Gates | Inputs From Storage | Inputs From Upper Level | Outputs from Each Level |
|---|---|---|---|---|---|
| 1 | 4 | 1 | 2 | 2 | 3 |
| 2 | 6 | 2 | 2 | 3 | 4 |
| 3 | 8 | 3 | 2 | 4 | 5 |
| 4 | 10 | 4 | 2 | 5 | 6 |
| 5 | 12 | 5 | 2 | 6 | 7 |

Table I gives some interesting figures which provide information as to the structure of the decoder. The first level has four AND-gates and each lower level thereafter has two more AND-gates than the one above it. For input purposes, the AND-gates are separated into pairs (input pairs) starting from the left side of each level, the Bus signal going to one gate in each pair and the inverted signal going to the other gate in ech pair. The inner AND-gates (excluding the first and last AND-gates such as AG-5 and AG-10) on each level are again arranged in pairs (output pairs), the output of each pair being coupled to a different OR-gate. Thus, on level 2, AG-5 and 6, AG-7 and 8, AG-9 and 10 form input pairs while AG-6 and 7, AG-8 and 9 form output pairs. Output pair AG-6 and 7 is coupled to OG-2 and output pair AG-8 and 9 is coupled to OG-3. The outputs from level 2 therefore consist of the outputs of the end AND-gates AG-5 and AG-10 and the outputs of the level-2 OR-gates OG-2 and OG-3.

The inputs to each level also include the outputs of the level above (but, in the case of level 1, these would be the Bus-1 or "Video Input" signal and the inverted Bus-1 signal). Each of these inputs is applied to both AND GATES IN A DIFFERENT INPUT PAIR, IN ORDER. Thus, the output from AG-1 is applied to the level-2 input pair OG-5 and 6, the output from OG-1 is applied to the level-2 input pair AG-7 and 8, and the output from AG-4 is applied to the level-2 input pair AG-9 and 10.

The outputs of the decoder are of different types depending on which side of the triangle they are taken from. Thus, the outputs along the base of the triangle indicate how many of the last six bits contained a logical one (assuming that a target return is a one signal and a lack of target return is a zero signal). Thus, if there were two ones in the last six bits, there would be a signal (a one) at OUT-2; if there were 5 ones in the last six bits, there would be a signal at OUT-5; etc. This can be termed m out of n occurrence detection, m being the number of true bits (or ones) (n can equal any number from zero to n) and n being the number of bit positions in the logical word which is being considered (n is also equal to the number of shift registers plus one). The outputs of the different levels likewise provide m out of n occurrence detection, where n is equal to the level number. Thus, at level 5, a one output signal for OG-8 provides an indication that there have been 2 ones in the last 5 bits.

For the evaluation of signal returns, a decision is made in accordance with various factors, such as signal interference level, false alarm tolerance, etc., as to how many one signals in how many bits will be taken to indicate a signal. Thus, it may be decided that four ones in seven bits are necessary and the decoder would be built with six levels, OUT-4 then being connected to the altering or display circuits. m out of n detection can also be applied to obtain the statistical distribution curves of incoming signals.

The outputs taken from the right-end AND-gates on each level indicate runs of ones, i.e., how many consecutive ones (or target returns) there have been. This is important when it is necessary to decide whether a target return is starting to be received. Thus, OUT-41 would provide a one signal when four consecutive ones are received.

The outputs taken from the left-end AND-gates on each level indicate runs of zeroes, i.e., how many consecutive zeros there have been. This is important in the decision as to whether a given target has disappeared (whether signal returns from it have ended). Thus, OUT-20 would provide a one signal when two consecutive zeroes are received.

The invention is of course used with receiving and signal utilization or display circuits.

A short example of how the decoder operates will now be given. Let the Video Input, or Bus-1 signal, be a one; then the output of INV-1 is a zero. Let the simultaneous signal output of SR-1 be a one; then the signal on BUS-2 is a one and the signal from INV-2 is a zero. The inputs to AG-1, 2, 3 and 4 are 00, 01, 01 and 11, respectively. OUT-20 is then 0, the outputs of AG-2 and 3 are 0, and OUT-21 is a 1. Now suppose the same previous conditions and an output of 0 on BUS-3. The output of INV-3 is a 1. The inputs to AG-5, 6, 7, 8, 9 and 10 are 10, 00, 10, 00, 11 and 10, respectively. OUT-30 is a 0, OUT-31 is a 0, and the outputs from AG-6, 7, 8 and 9 are 0, 0, 0 and 1, respectively. The outputs from OG-2 and 3 are 0 and 1, respectively. Since the output from OG-3 is the 2 out of 3 output a 1 from OG-3 indicates that there have been two one's in the last three bits.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A target-identifying circuit for use in beacon systems comprising:

storage means for chopping each interrogation period into a plurality of small range-bin periods and for providing a plurality of simultaneous outputs for each range-bin period comprising the signal received for that range-bin period during the immediate interrogation and a predetermined number of previous interrogations, said simultaneous outputs being derived in order for each range-bin period in the interrogation period and the whole process being repeated for each interrogation period; and decoding means arranged in the form of a Pascal's triangle for classifying the incoming video signals by an m-out-of n classification where n is the predetermined number of bit positions in the word to be analyzed, corresponding to the number of simultaneous storage means outputs plus one, and m is the number of true bits which occur in the word, corresponding to a number from zero to n.

2. A circuit as in claim 1, further providing outputs indicating runs of consecutive logical ones in the incoming and stored video signals.

3. A circuit as in claim 1, further providing outputs indicating runs of logical consecutive zeros in the incoming and stored video signals.

4. A target-identifying circuit for use in beacon systems comprising, in combination:
- a plurality of shift registers connected in series, the first of which receives the received video signal as an input, an output being taken from the last stage of each shift register so that there are a plurality of parallel outputs; and
- decoding means comprising a plurality of AND and OR-gates arranged in a Pascal triangle wherein the number of levels is equal to the number of shift registers, each level being associated with a different shift register and having as inputs the output of its associated shift register, the inverse of the shift-register output and the outputs of the level above it, except that the first or topmost level has as inputs the incoming video signal and its inverse in place of the outputs of the level above it,
- each level comprising a number of AND-gates horizontally arranged with all but the end AND-gates arranged in output pairs, each pair feeding into an OR-gate, the outputs of that level consisting of the outputs from the two end AND-gates and the OR-gates,
- the outputs from the lowest-level end AND-gates and OR-gates being m-out-of-n-occurrence indicating signals, where n is equal to the number of shift registers plus one, and m is a number selected from the group $0$ to $n$.

5. A circuit as in claim 4, further outputs being taken from each end AND-gate at the right side of the Pascal triangle to provide signals which indicate runs of logical ones in the received video signal and outputs being taken from each end AND-gate at the left side of the Pascal triangle to provide signals which indicate runs of logical zeroes in the received video signal.

* * * * *